United States Patent [19]
Mahabadi et al.

[11] Patent Number: 5,043,404
[45] Date of Patent: Aug. 27, 1991

[54] SEMISUSPENSION POLYMERIZATION PROCESSES

[75] Inventors: Hadi K. Mahabadi; Denise Wright, both of Mississauga, Canada

[73] Assignee: Xerox Corporation, Stamford, Conn.

[21] Appl. No.: 341,454

[22] Filed: Apr. 21, 1989

[51] Int. Cl.$^5$ ............................ C08F 2/20; C08F 2/24; C08F 20/14
[52] U.S. Cl. .................................... 526/194; 526/199; 526/200; 526/201; 526/88; 526/202; 526/233; 526/234; 526/263; 526/303.1; 526/307.7; 526/316; 526/317.1; 526/323.1; 526/328; 526/329.7; 526/334; 526/342; 526/345; 526/346
[58] Field of Search ................. 526/88, 199, 200, 201, 526/202, 206, 224, 194, 233, 234, 336, 335, 337, 323.1, 323.2

[56] References Cited

U.S. PATENT DOCUMENTS 3,954,898  5/1976  Hirota ................................. 526/320
4,486,559 12/1984  Murata et al. ..................... 523/468
4,680,200  7/1987  Solc .................................. 427/213.34
4,702,988 10/1987  Fukumoto et al. ................ 430/137

Primary Examiner—Christopher Henderson
Attorney, Agent, or Firm—E. O. Palazzo

[57] ABSTRACT

A process for the preparation of polymeric particles which comprises mixing at least one monomer with a polymerization initiator, a crosslinking component and a chain transfer component; effecting bulk polymerization until partial polymerization results; dispersing the aforementioned partially polymerized monomer product in water containing a stabilizing component to obtain a suspension of particles in water and polymerizing the resulting suspension.

35 Claims, No Drawings

SEMISUSPENSION POLYMERIZATION PROCESSES

BACKGROUND OF THE INVENTION

This invention is generally directed to semi-suspension polymerization processes, and more specifically to processes for the preparation of small polymeric particles, for example, in one embodiment with an average diameter of from about 0.1 micron to about 5 microns. More specifically, the present invention is directed to semi-suspension polymerization processes for the preparation of economically submicron polymeric particles, useful as powder coatings such as carrier powder coatings, photoreceptor cleaning additives, and in some instances toner resins, wherein a mixture of monomer or comonomers, a polymerization initiator, a crosslinking component and a chain transfer component are bulk polymerized until partial polymeriztion is accomplished, for example. In one embodiment, from about 10 to about 50 percent of monomer or comonomers are converted to polymer, thereafter the resulting partially polymerized monomer or comonomers is dispersed in water containing a stabilizing component with, for example, a high shear mixer, then the resulting suspension is transferred to a reactor and completely polymerized, followed preferably by washing and drying the polymer product. As indicated herein, the polymers obtained with the process of the present invention can, for example, be selected as coatings for carrier components utilized in developer mixtures comprised of toner and carrier compositions.

The formation of small polymeric particles for use in powder coatings and toner additives has been generally accomplished by emulsion polymerization and dispersion polymerization processes wherein a polymer in a liquid is heated to above its melting temperature and then cooled in the liquid to form particles. With these processes, it has been difficult to achieve low cost, clean (that is for example with no, or substantially no, impurities on the surface of the resulting particles), and/or dry particles of small particle size. The particles formed by suspension polymerization are generally larger than 50 microns thus they are not desirable as powder coatings or as toner additives. Grinding or attrition, especially fluid energy milling, of large particles to the size needed for powder coating, that is for example from about 0.1 to about 5 microns, is often not desirable both from an economic and functional viewpoint. Powder coatings with submicron particles are desirable as it allows complete coating of the particle, such as carrier beads, with a thinner film than is possible if only large particles are used. Also, submicron particles are very difficult to obtain by grinding or attrition. Further, processes such as spray drying of polymers suspended in solvent can result in polymer particles with particle sizes larger than one micron and a wide size range as well as trapping of solvent which interferes with the use of particles for coatings. Moreover, the solvent recovery in these processes is very costly.

There is disclosed in U.S. Pat. No. 3,505,434 a process wherein particles for fluidized bed powder coating are prepared by dispersing the polymer in a liquid which is heated to above the polymer melting point and stirred causing the polymer particles to form. The particles are then cooled below their melting point and recovered. However, this process does not, for example, enable particles with a size of below 50 microns.

Also, the suspension polymerization of monomer is known for the formation of polymer particles generally in a size range of about 200 microns and higher. The main advantage of suspension polymerization is that the product may easily be recovered, therefore, such a process is considered economical. However, it is very difficult by suspension polymerization to prepare very small particles as the monomer droplets tend to coalesce during the polymerization process, especially in the initial stage of polymerization where the droplets are very sticky. For example, there is disclosed in U.S. Pat. No. 3,243,419 a method of suspension polymerization wherein a suspending agent is generated during the suspension polymerization to aid in the coalescence of the particles. Also disclosed in U.S. Pat. No. 4,071,670 is a method of suspension polymerization wherein the monomer initiator mixture is dispersed in water containing stabilizer by a high shear homogenizer, followed by polymerization of suspended monomer droplets.

As a result of a patentability search there were located U.S. Pat. No. 4,486,559, which discloses the incorporation of a prepolymer into a monomer toner mix followed by emulsion polymerization; 4,680,200 and 4,702,988, which illustrate emulsion polymerization.

There thus remains a need for a process of obtaining very small polymeric particles, and more specifically submicron polymeric particles. Further, there is a need for semisuspension polymerization processes for obtaining clean and dry small, for example, from about 0.1 to about 5 microns in average diameter as determined by a scanning electron microscope, polymeric particles. Further, there is a need for semi-suspension polymerization processes that permit low cost, clean, and dry submicron polymeric particles that can be selected as carrier powder coatings, and as toner additives for photoreceptor cleaning.

SUMMARY OF THE INVENTION

It is, therefore, an object of this invention to provide processes for polymeric particle formation with many of the advantages illustrated herein.

In another object of the present invention there are provided simple processes for the formation of small polymeric particles, and more specifically submicron size polymeric particles.

Yet, in another object of the present invention there are provided simple and economical processes for the formation of polymeric particles, and more specifically submicron size polymeric particles.

Another object of the present invention resides in the provision of simple and economical processes for the preparation of low cost, clean, that is substantially no impurities, and dry polymeric particles, especially polymeric particles for powder coatings.

Another object of the present invention resides in simple and economical semisuspension polymerization processes for the preparation of low cost, clean, and dry small polymeric particles, and more specifically submicron size polymeric particles useful for carrier powder coating.

Further, another object of the present invention resides in simple and economical processes for producing low cost, clean and dry polymeric particles especially polymeric particles useful as toner additives and photoreceptor cleaning additives.

Additionally, in another object of the present invention there are provided as a result of the enhanced degree of control and flexibility processes for the preparation of polymeric particles with improved flow and fusing properties.

These and other objects of the present invention are accomplished by the provision of processes for the preparation of polymer particles, referred to herein as semisuspension polymerization processes in which a mixture of monomer or comonomers, a polymerization initiator, an optional crosslinking component and an optional chain transfer component is bulk polymerized until partial polymerization is accomplished, for example from about 10 to about 50 percent of monomer or comonomers is converted to polymer. The partially polymerized product is then dispersed in water containing a stabilizing component with, for example, a high shear mixer to permit the formation of a suspension containing small particles therein, and thereafter transferring the resulting suspension product to a reactor, followed by polymerization until complete conversion to the polymer product is achieved. The polymer product can then be washed and dried. More specifically, the process of the present invention is comprised of (1) mixing a monomer or comonomers with polymerization initiators, a crosslinking component and a chain transfer component; (2) effecting bulk polymerization by increasing the temperature of the mixture to from about 45° C. to about 120° C. until from about 10 to about 50 weight percent of monomer or comonomers has been polymerized; (3) dispersing the partially polymerized monomer product in from about 2 to about 5 times its volume water containing from about 1 to about 5 weight percent of a stabilizing component to form suspension with a particle size diameter of from about 0.1 micron to about 5.0 microns using a high shear mixer; (4) transferring the resulting suspension to a reactor and polymerizing the suspension by increasing its temperature to from about 45° C. to about 120° C. to allow the complete conversion of monomer or comonomers to polymer; (5) washing the product with water and/or methanol; (6) separating particles from water/methanol by means of filtration or centrifugation; and (7) drying the polymeric particles.

One important specific embodiment of the present invention comprises the preparation of polymeric particles, which comprises mixing at least one monomer with a polymerization initiator, a crosslinking component and a chain transfer component; effecting bulk polymerization until from about 10 to about 50 weight percent of the monomer has been polymerized; dispersing the aforementioned partially polymerized monomer product in water containing a stabilizing component to obtain a suspension of particles with an average diameter of from about 0.1 to about 5 microns in water; and polymerizing the resulting suspension. By at least one monomer is intended to include from about 2 to about 20 monomers, comonomers thereof, and the like providing the objectives of the present invention are achieved.

Also, the process of the present invention is directed to the preparation of small polymeric particles, that is with, for example, an average particle diameter in the range of from about 0.1 micron to about 5 microns, a number and weight average molecular weight of from about 5,000 to about 500,000 and from about 10,000 to about 2,000,000, respectively.

Further, the process of the present invention is directed to the preparation of polymeric particles of average diameter of from about 0.1 micron to about 0.8 micron with a number average molecular weight of from about 5,000 to about 50,000 and a weight average molecular weight of from about 100,000 to about 500,000 useful for carrier coatings, as photoreceptor cleaning additives, and as toner additives. More specifically, the process of the present invention in this embodiment is directed to the preparation of polymeric particles of average diameter in the range of about 0.1 to about 0.8 micron, a number average molecular weight in the range of from about 5,000 to about 50,000, and a weight average molecular weight of from about 100,000 to about 500,000 for carrier powder coatings and toner additives. This process is as indicated herein and specifically comprises (1) mixing a monomer or comonomer with a polymerization initiator with the ratio of monomer or comonomers to initiator being from about 100/2 to about 100/20, a crosslinking component with the ratio of monomers or comonomers to crosslinking component being from about 100/0.1 to about 100/5, and a chain transfer component with the ratio of monomer or comonomers to the chain transfer component being from about 100/0.01 to about 100/1; (2) effecting bulk polymerization by increasing the temperature of the mixture to from about 45° C. to about 120° C. until from about 10 to about 50 weight percent of monomer or comonomers has been converted to polymer with a number average molecular weight of from 5,000 to about 50,000 and a weight average molecular weight from about 10,000 to about 40,000; (3) dispersing the partially polymerized monomer product from about 2 to about 5 times its volume in water containing from about 1 to about 5 weight percent of a stabilizing component, preferably polyvinylalcohol having a weight average molecular weight of from 1,000 to about 10,000, to form a suspension containing particles with a particle size diameter of from 0.1 to about 0.8 micron by using high shear mixer; (4) transferring the resulting suspension to a reactor and polymerizing the suspension by increasing its temperature to from about 45° C. to about 120° C. to allow the complete conversion of monomer or comonomers to polymer; (5) washing the resulting product with equal volumes of methanol and/or water from about 3 to about 5 times; (6) separating polymeric particles from water/methanol by means of filtration or centrifugation, and (7) drying of the polymeric particles.

Illustrative examples of monomer or comonomers present in an amount of, for example, from about 80 to about 99 weight percent include vinyl monomers consisting of styrene and its derivatives such as styrene, α-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids having a double bond and their derivatives such as maleic acid, monobutyl maleate, dibutylmaleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated mono-olefins such as isobutylene and the like; vinylidene halides such as vinylidene chloride and the like; N-vinyl compounds such as N-vinyl pyrrole and the like; and mixtures thereof.

Illustrative examples of polymerization initiators present in an amount of, for example, from about 0.1 to about 20 weight percent of monomer include azo compounds such as 2,2'azodimethylvaleronitrile, 2,2'azoisobutyronitrile, azobiscyclohexanenitrile, 2-methylbutronitrile and the like, and peroxide such as benzoyl peroxide, lauryl peroxide, 1-1-(t-butylperoxy)-3,3,5-trimethylcyclohexane, n-butyl-4,4-di-(t-butylperoxy)valerate, dicumyl peroxide and the like. Crosslinkers selected for the process of the present invention are chiefly comprised of compounds having two or more polymerizable double bonds. Examples of such compounds include aromatic divinyl compounds such as divinylbenzene and divinylnaphthalene; carboxylic acid esters having two double bounds such as ethylene glycol diacrylate, ethylene glycol dimethylacrylate and the like; divinyl compounds such as divinyl ether, divinyl sulfite, divinyl sulfone and the like. Among these divinylbenzene is particularly useful. The crosslinking component is preferably present in an amount of from about 0.1 to about 5 parts by weight in 100 parts by weight of monomer or comonomers mixture.

Stabilizers present in an amount of, for example, from about 0.1 to about 5 weight percent of water are selected from the group consisting of both nonionic and ionic water soluble polymeric stabilizers such as methyl cellulose, ethyl cellulose, hydroxypropyl cellulose, block copolymer such as Pluronic E87 from BASF, sodium salt of carboxyl methyl cellulose, polyacrylate acids and their salts, polyvinyl alcohol, gelatins, starches, gums, alginates, zein and casein and the like; and barrier stabilizers such as tricalcium phosphate, talc, barium sulfate and the like. Among these polyvinyl alcohol with a weight average molecular weight of from about 1,000 to about 10,000 is particularly useful.

Chain transfer components selected which primarily function to control molecular weight by inhibiting chain growth include mercaptans such as laurylmercaptan, butylmercaptan and the like, or halogenated carbons such as carbon tetrachloride or carbon tetrabromide and the like. The chain transfer agent is preferably present in an amount of from about 0.01 to about 1 weight percent of monomer or comonomer mixture. Also, stabilizer present on the surface of the polymeric particles can be washed using an alcohol such as, for example, methanol and the like, or water. Separation of washed particles from solution can be achieved by any classical separationn technique such as filtration, centrifugation and the like. Classical drying techniques such as vacuum drying, freeze drying, spray drying, fluid bed drying and the like can be selected for drying of the polymeric particles.

The particles of the present invention can be selected as carrier coatings, which carriers contain, for example, a steel core, and can be admixed with toner compositions comprised of resin particles, pigment particles and optional additives such as charge control components, reference U.S. Pat. No. 4,560,635, the disclosure of which is totally incorporated herein by reference enabling the formation of a developer composition useful in electrophotographic imaging processes.

The following examples are being submitted to further define various species of the present invention. These examples are intended to be illustrative only and are not intended to limit the scope of the present invention. Also, parts and percentages are by weight unless otherwise indicated.

EXAMPLE I

To 300 grams of methyl methacrylate monomer were added 20 grams of 2,2'-azobis(2,4-dimethylvaleronitrile) followed by mixing in a flask until the monomer was dissolved, in about 10 minutes. This mixture was then bulk polymerized by heating in a two liter glass reactor to 45° C. by means of an oil bath while the mixture was stirred with a Teflon propeller until 20 percent of the monomer was converted to polymer with a number average molecular weight of 20,900 and a weight average molecular weight of 39,400 as measured by gel permeation chromatography. The monomer/polymer mix was then poured together with 1,100 cc of water containing four weight percent polyvinyl alcohol having a weight average molecular weight of 3,000 into a four liter stainless steel beaker. The beaker was placed in an ice bath and using a Brinkmann PT456G polytron homogenizer the mixture was then vigorously stirred at 10,000 revolutions per minute for 5 minutes to produce a microsuspension of polymeric particles in water. The suspension was then transferred to a 2 liter glass reactor equipped with a Teflon propeller stirring at a speed of 150 revolutions per minute. The stirring contents of the reactor were heated to 45° C. and controlled at that temperature by means of an oil bath, heated tape around the reactor and a heated mantle lid cover. After four hours within which the suspension polymerization was complete, the microsuspension product was poured into two liters of methanol. The resulting diluted suspension was then centrifuged for 15 minutes at 70 percent power in a six container explosion proof centrifuge. The supernatant liquid consisting of diluted polyvinyl alcohol was decanted, 3 liters of fresh methanol were added and the mixture was polytroned for 1 to 2 minutes at 5,000 revolutions per minute to disperse the particles. This washing procedure was repeated three times with methanol and three times with deionized water. After the final wash, the slurry was poured into glass freeze drying bottles and freeze dried to provide stabilizer free dry individual particles. Using a scanning electron microscope, photomicrographs of the dry polymer product were taken and evidenced an average particle size of 0.6 micron. As measured by gel permeation chromatography, the number average molecular weight was 53,000 and the weight average molecular weight was 600,000 for the polymer product. The above resulting polymer product of polymethyl methacrylate particles were then mixed with Kynar polymer particles in a ratio of 70/30.

This mixture was then added to a Toniolo core material (200 micron diameter core carrier) in a Munson mixer at 27.5 revolutions per minute and 30° C. The polymer covering the surface of Toniolo core was then fused in a kiln at 400° F., followed by cooling. The functional evaluation of the resulting coated carrier particles evidences an acceptable voltage breakdown of 1,240 volts.

EXAMPLE II

The process of Example I was repeated with the exceptions that the suspension temperature profile was changed and the polymerization was accomplished in a 1 liter stainless steel PARR reactor with an aluminum block heater and cold water coil cooling. The suspension polymerization temperature was raised from 25° to 45° C. in 30 minutes where it was held for 2 hours, then the temperature was increased to 80° C. in 120 minutes and maintained at 120 for 1 hour, when it was then cooled in 30 minutes to 20° C. The resulting polymethyl methacrylate product had an average particle size of 0.6 micron, a number average molecular weight of 29,000 and a weight average molecular weight of 250,000.

EXAMPLE III

The process of Example I was repeated with the exceptions that the monomer mixture was bulk polymerized until 10 percent of the monomer was converted to polymer. The resulting polymethyl methacrylate product had an average particle size of 0.8 micron, a number average molecular weight of 53,000, and a weight average molecular weight of 582,000.

EXAMPLE IV

The process of Example I was repeated with the exceptions that the monomer mixture was bulk polymerized until 35 percent of the monomer was converted to polymer. The resulting polymethyl methacrylate product had an average diameter particle size of 1 micron, a number average molecular weight of 37,000 and a weight average molecular weight of 474,000.

EXAMPLE V

The process of Example I was repeated with the exceptions that the partially polymerized product was dispersed in water containing one percent polyvinyl alcohol. The resulting polymethyl methacrylate product had an average diameter particle size of 5 microns, a number average molecular weight of 17,600 and a weight average molecular weight of 301,500.

EXAMPLE VI

To 500 grams of methyl methacrylate monomer were added 20 grams of 2,2'-azobis(2,4-dimethylvaleronitrile) which were mixed until dissolved. This mixture was then bulk polymerized by heating in a two liter glass reactor to 45° C. by means of an oil bath while the mixture was stirred with a Teflon propeller until 20 percent of the monomer was converted to polymer. The monomer/polymer mix was then poured together with 1,100 cc of water containing four weight percent polyvinyl alcohol with a weight average molecular weight of 3,000 into a four liter stainless steel hopper attached to a M-110 laboratory microfluidizer (a high shear mixer from Microfluidics Corporation) with a dynamic pressure of 55 pounds per square inch and a flow rate of 444 milliliters/minute. The mixture was passed through the grinding chamber of the high shear mixer four times until a uniform suspension was formed. The suspension was then transferred to a 2 liter glass reactor equipped with a Teflon propeller with a stirring speed of 150 revolutions per minute. The stirring reactor contents were heated to 55° C. and controlled at that temperature by means of an oil bath, heated tape around the reactor and a heated mantle lid cover. After four hours, the suspension polymerization was completed, and the microsuspension product was poured into two liters of methanol. The resulting diluted suspension was then centrifuged 15 minutes at 70 percent power in a six container explosion proof centrifuge. The supernatant liquid consisting of the diluted polyvinyl alcohol was than decanted, 3 liters of fresh methanol was added thereto and the mixture was polytroned for 1 to 2 minutes at 5,000 revolutions per minute to disperse the particles. This washing procedure was repeated three times with methanol and three times with deionized water. After the final wash, the slurry was poured into glass freeze drying bottles and freeze dried to yield stabilizer free dry individual particles. Using a scanning electron microscope, photomicrographs of the dry product were taken evidencing an average particle size diameter of 0.6 micron for the polymethacrylate product. As measured by gel permeation chromatography, the number average molecular weight of the polymer product was 46,800 and the weight average molecular weight was 695,000.

EXAMPLE VII

The process of Example VI was repeated with the exception that 1,100 cc of water containing one percent hydroxypropyl cellulose stabilizer was selected. The resulting product had an average particle diameter size of 18 microns. The number average molecular weight for the polymer product polymethyl methacrylate was 63,000 and the weight average molecular weight was 380,000.

EXAMPLE VIII

The process of Example VII was repeated except that 1,100 cc of water containing 0.5 percent hydroxypropyl cellulose stabilizer was selected. The resulting product had an average diameter particle size of 32 microns. The number average molecular weight of the polymer product polymethyl methacrylate was 328,000 and the weight average molecular weight was 7,985,000.

EXAMPLE IX

The process of Example VII was repeated except that 1,100 cc of water containing three percent hydroxypropyl cellulose stabilizer was selected. The resulting polymethyl methacrylate product had an average diameter particle size of 4 microns. The number average molecular weight was 92,000 and the weight average molecular weight was 480,000 for the polymer product.

EXAMPLE X

The process of Example IX was repeated except that 1,100 cc of water containing three percent F87 Pluronic (BASF) stabilizer was selected. The resulting polymethyl methacrylate product had an average particle diameter size of 0.3 micron. The number average molecular weight was 58,900 and the weight average molecular weight was 408,000 for the polymethyl methacrylate polymer product.

EXAMPLE XI

The process of Example X was repeated except that 1,100 cc of water containing 5 percent F87 Pluronic (BASF) stabilizer was used and partially polymerized methyl methacrylate was dispersed in water Pluronic solution by using the Brinkmann PT456G polytron as a high shear mixer. The resulting product had an average particle size of 0.15 micron. The number average molecular weight was 133,000 and the weight average molecular weight was 905,000 for the polymethyl methacrylate polymer product.

EXAMPLE XII

To 500 grams of methyl methacrylate monomer were added 20 grams of 2,2'-azobis(2,4-dimethylvaleronitrile) which were mixed until dissolved. This mixture was bulk polymerized by heating it in a two liter glass reactor to 45° C. by means of an oil bath, while the mixture was stirred with a Teflon propeller until 20 percent of the monomer was converted to polymer. The monomer/polymer mix was then poured, along with 1,100 cc of water containing two weight percent of polyvinyl alcohol with a weight average molecular weight of 3,000, into a four liter stainless steel beaker. The beaker was placed in an ice bath and using an IKA Ultra-Turrax G45M as a high shear mixer for 3 minutes, followed by another 3 minutes of high shear mixing with a G45FF, the mixture was vigorously stirred at 10,000 revolutions per minute to produce a microsuspension of polymeric particles in water. The suspension was then transferred to a 2 liter glass reactor equipped with a Teflon propeller with a stirring speed of 150 revolutions per minute. The reactor was then heated to 60° C. and controlled at that temperature by means of an oil bath, heated tape around the reactor and a heated mantle lid cover. After four hours, by which time the suspension polymerization was complete, the microsuspension product was poured into two liters of methanol. The resulting diluted suspension was centrifuged 15 minutes at 70 percent power in a six container explosion proof centrifuge. The supernatant liquid consisting of the diluted polyvinyl alcohol was decanted, 3 liters of fresh methanol was added and the mixture was polytroned for 1-2 minutes at 5,000 revolutions per minute to disperse the particles. This washing procedure was repeated three times with methanol and three times with deionized water. After the final wash, the slurry was poured into glass freeze drying bottles and freeze dried to yield clean stabilizer free dry individual particles. Using a scanning electron microscope, photomicrographs of the dry product were taken and evidenced an average particle size diameter of one micron for the polymer product. As measured by gel permeation chromatography, the number average molecular weight was 70,000 and the weight average molecular weight was 705,000 for the polymethacrylate polymer product.

EXAMPLE XIII

The process of Example XII was repeated except that 20 grams of lauryl peroxide initiator were mixed with monomer and 1,100 cc of water containing 2 weight percent polyacrylic acid (having a weight average molecular weight of 250,000) and 0.2 weight percent of alkanol were used. The IKA Ultra-Turrax G45M high shear mixer was selected for 2 minutes and the G45FF high shear mixer was used for 5 minutes to disperse the partially polymerized methyl methacrylate in a water polyacrylic acid solution. The resulting polymethacrylate product had an average particle size of 0.6 micron.

EXAMPLE XIV

The process of Example XIII was repeated except that styrene was used as the monomer. The resulting styrene product had an average particle size diameter of 4 microns.

EXAMPLE XV

To 181.2 grams of styrene monomer were added 118.8 grams of n-butyl methacrylate monomer and 5 grams of benzoyl peroxide initiator which were mixed until dissolved. This mixture was bulk polymerized by heating in a two liter glass reactor to 80° C. by means of an oil bath while the mixture was stirred with a Teflon propeller until 20 percent of the monomer was converted to polymer. The monomer/polymer mix was then poured together with 1,100 cc of water containing 0.5 weight percent polyvinyl alcohol having a weight average molecular weight of 3,000 into a four liter stainless steel beaker. The beaker was placed in an ice bath and using the Brinkmann PT456G polytron homogenizer the mixture was then vigorously stirred at 7,000 revolutions per minute for 2 minutes to produce microsuspension of polymeric particles in water. The suspension was then transferred to a 2 liter glass reactor equipped with a Teflon propeller with stirring speed of 150 revolutions per minute, the reactor was heated to 70° C. and controlled at that temperature by means of an oil bath, heated tape around the reactor and a heated mantle lid cover. After four hours, the suspension polymerization was completed, and the microsuspension product was poured into two liters of methanol. The resulting diluted suspension was then centrifuged 15 minutes at 70 percent power in a six container explosion proof centrifuge. The supernatant liquid consisting of the diluted polyvinyl alcohol was decanted, fresh methanol was added and the mixture was polytroned for 1 to 2 minutes at 5,000 revolutions per minute to disperse the particles. This washing procedure was repeated three times with methanol and three times with deionized water. After the final wash, the slurry was poured into glass freeze drying bottles and freeze dried to yield stabilizer free dry individual particles. Using a scanning electron microscope, photomicrographs of the dry product were taken and evidenced an average particle size diameter of 3 microns for the polymer product of styrene n-butylmethacrylate.

EXAMPLE XVI

To 300 grams of methyl methacrylate monomer were added 1.634 grams of benzoyl peroxide which were mixed until dissolved. This mixture was then bulk polymerized by heating it in a two liter glass reactor to 80° C. by means of an oil bath while the mixture was stirred with a Teflon propeller until 20 percent of the monomer was converted to polymer and as measured by gel permeation chromatography the number average molecular weight was 146,000 and the weight average molecular weight was 271,000 for the polymer. The monomer/polymer mix was then poured, along with 1,100 cc of water containing 2 weight percent polyvinyl alcohol having a weight average molecular weight of 3,000, into a four liter stainless steel beaker. The beaker was placed in an ice bath and using a Brinkmann PT456G polytron homogienizer the mixture was then vigorously stirred at 10,000 revolutions per minute for 5 minutes to produce a microsuspension of polymeric particles in water. The suspension was then transferred to a 2 liter glass reactor equipped with a Teflon propeller with stirring speed of 150 revolutions per minute and the reactor was heated to 80° C., and controlled at that temperature by means of an oil bath, heated tape around the reactor and a heated mantle lid cover. After four hours, the suspension polymerization was complete and the microsuspension product was poured into two liters of deionized water. The resulting diluted suspension was then centrifuged 15 minutes at 70 percent power in a six container explosion proof centrifuge. The supernatant liquid consisting of the diluted polyvinyl alcohol was decanted, fresh water was added and the mixture was polytroned for 1 to 2 minutes at 5,000 revolutions per minute to disperse the particles. This washing procedure was repeated six times with deionized water. After the final wash, the slurry was poured into glass freeze drying bottles and freeze dried to give dry individual particles. Using a scanning electron microscope, photomicrographs of the dry product were taken and evidenced a average particle diameter size of 0.6 micron. As measured by gel permeation chromatography, the number average molecular weight was 313,000 and the weight average molecular weight was 960,000 for the polymethacrylate polymer product. The resulting polymethyl methacrylate particles were mixed with Kynar polymer particles in a ratio of 70/30. They were then added to the Toniolo core material (200 micron core carrier) in a Munson mixer at 27.5 revolutions per minute and 30° C. The polymer covering the surface of the Toniolo core was then fused in a kiln at 400° F. providing carrier coating for the core. The functional evaluation of the resulting coated carrier evidenced a voltage breakdown of 500 volts.

EXAMPLE XVII

The process of Example XVI was repeated except 4.98 grams benzoyl peroxide initiator and a suspension temperature of 85° C. was used. The number average molecular weight was 149,000 and the weight average molecular weight of the polymer product was 596,000 as measured by gel permeation chromatography. The average particle diameter size of the polymer product was 0.6 micron. The resulting polymethyl methacrylate particles were mixed with Kynar polymer particles in a ratio of 70/30. They (the mixture of particles) were then added to Toniolo core material (200 micron core carrier) in a Munson mixer at 27.5 revolutions per minute and 30° C. The polymer covering the surface of the Toniolo core was then fused in a kiln at 400° F. to provide a carrier coating for the Toniolo carrier core. The functional evaluation of the resulting coated carrier evidenced an acceptable voltage breakdown of 1,200 volts.

EXAMPLE XVIII

The process of Example I was repeated except the temperature of the suspension polymerization was raised to 55° C. The resulting product had an average particle diameter size of one micron. The number average molecular weight was 40,700 and the weight average molecular weight was 344,000 for the polymer product.

In copending application U.S. Ser. No. 339,539 pending entitled Processes for the Preparation of Toners, the disclosure of which is totally incorporated herein by reference, there is illustrated a process for the preparation of toner particles which comprises mixing at least one resin monomer with a polymerization initiator, a crosslinking component and a chain transfer component; effecting bulk polymerization until partial polymerization has been accomplished; mixing with the aforementioned partially polymerized product pigment or dye particles, thereby forming an organic phase; dispersing the organic phase in water containing a stabilizing component whereby there is obtained a suspension of toner particles in water; and polymerizing the toner suspension.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for the preparation of polymeric particles which comprises mixing at least one monomer with a polymerization initiator, a crosslinking component and a chain transfer component; effecting bulk polymerization until from about 10 to about 50 weight percent of the monomer has been polymerized; dispersing with a high shear mixer the aforementioned partially polymerized product in water containing a stabilizing component selected from a group consisting of non-ionic and ionic water soluble polymeric stabilizers to obtain a suspension of particles with an average diameter of from about 0.1 to about 5 microns in water; and polymerizing the resulting suspension.

2. A process in accordance with claim 1 wherein a mixture of monomers is selected.

3. A process in accordance with claim 2 wherein the mixture contains from 2 monomers to about 20 monomers.

4. A process in accordance with claim 1 wherein the polymerized product obtained is subjected to washing and drying.

5. A process in accordance with claim 1 wherein the polymeric particles obtained have an average particle diameter of from about 0.1 micron to about 5 microns.

6. A process in accordance with claim 1 wherein heating is accomplished at a temperature of from about 45° C. to about 120° C.

7. A process in accordance with claim 1 wherein the number and weight average molecular weight of the bulk polymerization product is between about 5,000 to about 500,000 and about 10,000 to about 1,000,000, respectively.

8. A process in accordance with claim 1 wherein the number and weight average molecular weight of the final polymer product is between about 5,000 to about 500,000 and about 10,000 to about 2,000,000, respectively.

9. A process in accordance with claim 1 wherein the dispersion of the partially polymerized monomer in water containing the stabilizing component is accomplished with a high shear mixer.

10. A process in accordance with claim 1 wherein the monomer is selected from the group consisting of styrene and its derivatives.

11. A process in accordance with claim 1 wherein the monomer is selected from the group consisting of α-methyl-styrene, p-chlorostyrene, monocarboxylic acids and the derivatives thereof; dicarboxylic acids with a double bond and their derivatives; vinyl ketones; vinyl naphthalene; unsaturated mono-olefins; vinylidene halides; N-vinyl compounds; and mixtures thereof.

12. A process in accordance with claim 1 wherein the monomer is selected from the group consisting of acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; maleic acid, monobutyl maleate, dibutyl maleate; vinyl chloride, vinyl acetate and vinyl benzoate; vinylidene chloride and N-vinyl pyrrole.

13. A process in accordance with claim 1 wherein the polymerization initiator is selected from the group consisting of azo compounds and peroxides.

14. A process in accordance with claim 13 wherein the polymerization initiator is benzoyl peroxide, lauryl peroxide, 1-1-(t-butylperoxy)-3,3,5-trimethylcyclohexane, n-butyl-4,4-di-(t-butylperoxy)valerate, dicumyl peroxide, 2,2'azodimethylvaleronitrile, 2,2'azoisobutyronitrile, azobiscyclohexanenitrile, or 2-methylbutronitrile.

15. A process in accordance with claim 1 wherein the stabilizing component is selected from the group consisting of methyl cellulose, ethyl cellulose, hydroxypropyl cellulose, the sodium salt of carboxyl methyl cellulose, polyacrylate acids and their salts, polyvinyl alcohol, gelatins, starches, gums, alginates, zein and casein.

16. A process in accordance with claim 1 wherein the stabilizing component is tricalcium phosphate, talc or barium sulfate.

17. A process in accordance with claim 1 wherein the crosslinking component is selected from a group consisting of compounds having two or more polymerizable double bonds.

18. A process in accordance with claim 1 wherein the crosslinking component is divinylbenzene, divinylnaphthalene, ethylene glycol diacrylate, or divinylether.

19. A process in accordance with claim 1 wherein the chain transfer component is selected from a group consisting of mercaptans and halogenated hydrocarbons.

20. A process in accordance with claim 19 wherein the chain transfer component is carbon tetrachloride, butylmercaptan, or laurylmercaptan.

21. A process for the preparation of polymeric particles useful for powder coating which comprises mixing at least one monomer with a polymerization initiator, a crosslinking component and a chain transfer component; effecting bulk polymerization until from about 10 to about 50 weight percent of the monomer has been polymerized; dispersing with a high shear mixer the aforementioned partially polymerized product in water containing a stabilizing component selected from a group consisting of non-ionic and ionic water soluble polymeric stabilizers to obtain a suspension of particles with an average diameter of from about 0.1 to about 0.8 micron; and polymerizing the resulting suspension wherein bulk and suspension polymerization is accomplished by heating at a temperature of from about 30° C. to about 200° C.

22. A process in accordance with claim 21 wherein a mixture of monomers is selected.

23. A process in accordance with claim 21 wherein the mixture contains from 2 monomers to about 20 monomers.

24. A process in accordance with claim 21 wherein the polymerized product obtained is subjected to washing and drying.

25. A process in accordance with claim 21 wherein bulk and suspension polymerization is accomplished by heating to a temperature between about 30° C. to about 200° C.

26. A process in accordance with claim 21 wherein the number and weight average molecular weight of the polymer produced in the bulk polymerization step is between about 5,000 to about 50,000 and about 10,000 to about 100,000, respectively.

27. A process in accordance with claim 21 wherein the number and weight average molecular weight of the final polymeric product particles are between about 10,000 to about 40,000 and about 200,000 to about 500,000, respectively.

28. A process in accordance with claim 21 wherein the dispersion of partially polymerized monomer or comonomers in water containing the stabilizing component is accomplished with a high shear mixer.

29. A process in accordance with claim 21 wherein the monomer is selected from vinyl monomers consisting of styrene and its derivatives, monocarboxylic acids and the derivatives thereof; dicarboxylic acids with a double bond and the derivatives thereof; vinyl ketones; vinyl ethers; vinyl naphthalene; unsaturated mono-olefins; vinylidene halides; N-vinyl compounds; or mixtures thereof.

30. A process in accordance with claim 21 wherein the polymerization initiator is selected from the group consisting of 2,2'azodimethylvaleronitrile, 2,2'azoisobutyronitrile, azobiscyclohexanenitrile, 2-methylbutronitrile, benzoyl peroxide, lauryl peroxide, 1-1-(t-butylperoxy)-3,3,5-trimethylcyclohexane, n-butyl-4,4-di-(t-butylperoxy)valerate, or dicumyl peroxide.

31. A process in accordance with claim 21 wherein a crosslinking component is selected from a group consisting of divinylbenzene, divinylnaphthalene, ethylene glycol diacrylate, divinylether and the like.

32. A process in accordance with claim 21 wherein the chain transfer component is selected from a group consisting of mercaptans such as butylmercaptan, laurylmercaptan, and halogenated carbons.

33. A process in accordance with claim 21 wherein the polymer particles can be selected for the coating of carrier cores.

34. A process in accordance with claim 1 wherein the resulting particles are selected as a resin component for toner compositions.

35. A process in accordance with claim 21 wherein the resulting particles are selected as a resin component for toner compositions.

* * * * *